United States Patent [19]

Gevaert et al.

[11] Patent Number: 5,709,156
[45] Date of Patent: Jan. 20, 1998

[54] FLIP-UP ELECTRICAL AND COMMUNICATIONS DEVICE FOR USE IN COMBINATION WITH A WORKSURFACE

[75] Inventors: Steven C. Gevaert; Thomas J. Barchacky, both of Green Bay, Wis.

[73] Assignee: Krueger International, Inc., Green Bay, Wis.

[21] Appl. No.: 475,712

[22] Filed: Jun. 7, 1995

[51] Int. Cl.⁶ .................................................. A47B 35/00
[52] U.S. Cl. .......................... 108/50; 108/26; 312/223.6
[58] Field of Search ........................ 108/50, 23, 25, 108/26; 312/223.6, 223.1

[56] References Cited

U.S. PATENT DOCUMENTS

| | | |
|---|---|---|
| 3,876,006 | 4/1975 | Messenger . |
| 4,372,629 | 2/1983 | Propst et al. ............... 312/223.6 X |
| 4,848,175 | 7/1989 | Hauville ...................... 108/50 X |
| 4,950,839 | 8/1990 | Quinn et al. ................ 312/223.1 X |
| 4,967,041 | 10/1990 | Bowman . |
| 5,003,130 | 3/1991 | Danforth et al. . |
| 5,050,267 | 9/1991 | Quest ........................... 312/223.6 X |
| 5,108,053 | 4/1992 | Biederstedt . |
| 5,108,122 | 4/1992 | Beagley . |
| 5,119,966 | 6/1992 | McKim et al. . |
| 5,179,252 | 1/1993 | Yang . |
| 5,195,900 | 3/1993 | Kumagai et al. . |
| 5,211,706 | 5/1993 | Polgar . |
| 5,216,203 | 6/1993 | Gower . |
| 5,230,552 | 7/1993 | Schipper et al. ............ 312/223.6 |
| 5,231,562 | 7/1993 | Pierce et al. ................ 108/50 X |
| 5,299,943 | 4/1994 | Shieh . |
| 5,337,447 | 8/1994 | Tanaka et al. . |
| 5,366,387 | 11/1994 | Yamanashi . |

FOREIGN PATENT DOCUMENTS

| | | |
|---|---|---|
| 0121644 | 4/1983 | European Pat. Off. . |
| 0410588 | 1/1991 | European Pat. Off. . |
| 0648001 | 4/1995 | European Pat. Off. . |
| 2916002 | 11/1980 | Germany ...................... 312/223.6 |
| 1501875 | 2/1978 | United Kingdom . |
| 2182640 | 5/1987 | United Kingdom . |
| 2241389 | 8/1991 | United Kingdom . |
| 2277206 | 10/1994 | United Kingdom . |
| 8100965 | 4/1981 | WIPO ........................... 312/223.6 |

*Primary Examiner*—Jose V. Chen
*Attorney, Agent, or Firm*—Andrus, Sceales, Starke & Sawall

[57] ABSTRACT

A utility receptacle assembly for use in combination with a worksurface includes a base mountable to the worksurface and a utility receptacle pivotably and removably mounted to the base. The base includes a passage within which the utility receptacle member is received, and the base further includes at least one recess located adjacent the passage. A cover member is secured to the utility receptacle member, and functions to enclose the passage and the recess when the utility receptacle member is in a closed, inoperative position and to provide access to the recess when the utility receptacle member is moved to an open, operative position. The utility receptacle member and the base include releasable engagement structure for maintaining the utility receptacle member in its open, operative position. The releasable retainer structure is manually engageable by a user for returning the utility receptacle member to its closed, inoperative position. A cable extends into an internal cavity defined by the utility receptacle member, and a strain relief assembly prevents movement of the cable relative to the utility receptacle member. The recess includes a bottom section for mounting a communication jack having a first mounting configuration, and the bottom section is removable and replaceable with a different bottom section for mounting a communication jack having a different mounting configuration.

28 Claims, 5 Drawing Sheets

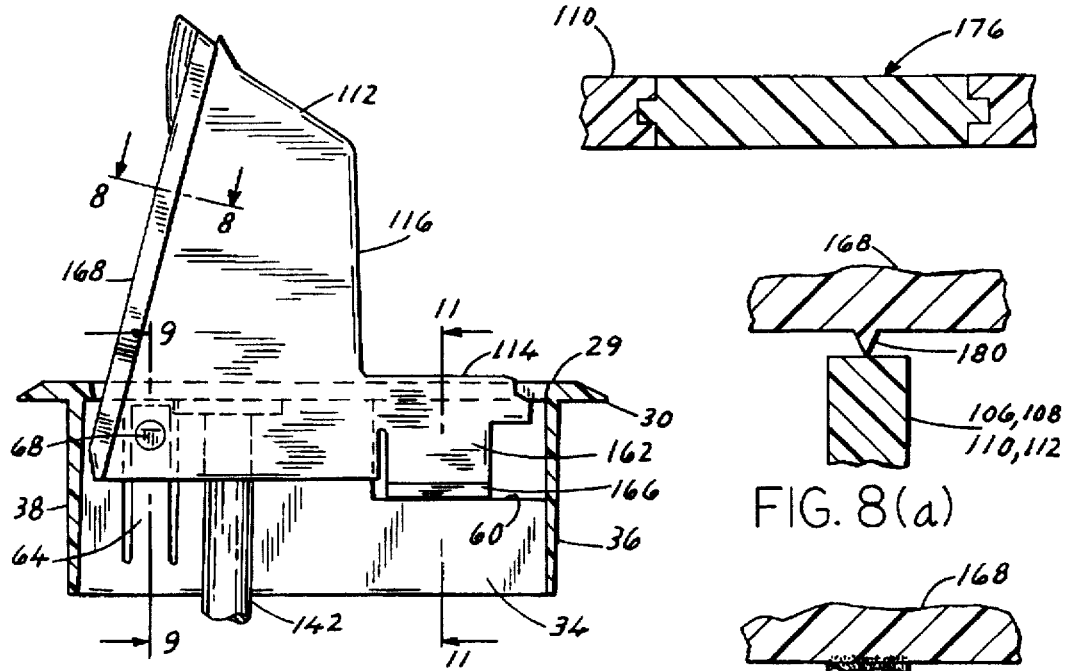
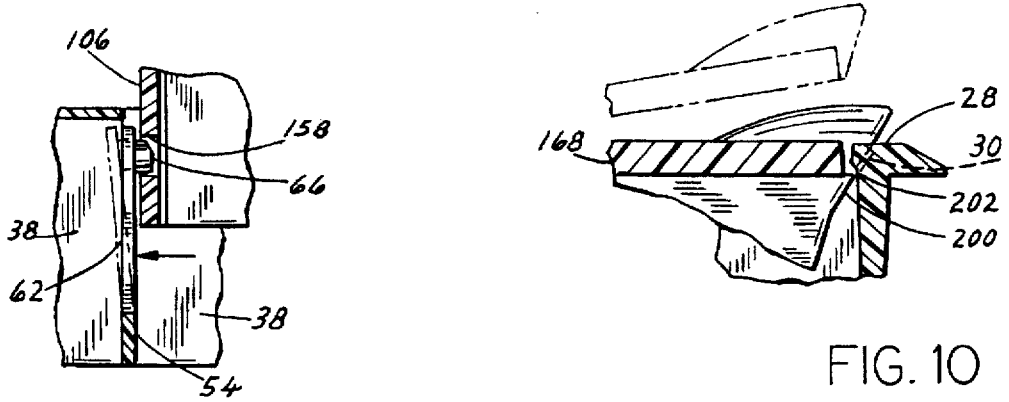
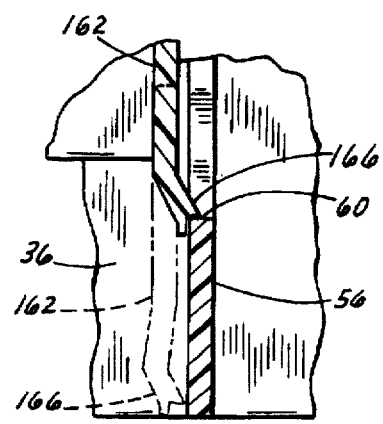

FLIP-UP ELECTRICAL AND COMMUNICATIONS DEVICE FOR USE IN COMBINATION WITH A WORKSURFACE

BACKGROUND AND SUMMARY OF THE INVENTION

This invention relates to a utility receptacle assembly for use in combination with a worksurface, in which the assembly is movable between an operative position providing access to a utility receptacle and an inoperative or storage position for preventing access to the receptacle.

With increasing use of portable or lap top computers and other electronic equipment, it is desirable to provide power and data receptacles in a convenient and readily accessible location providing easy access by the user to the receptacles. Such equipment is often used in environments such as college classrooms, lecture halls, residence halls, offices, hotel rooms, and business or institutional training or conference facilities. To this end, power and communication capabilities are advantageously provided in worksurfaces for rooms or facilities of this type, such as in desks, tables, library carrels and the like.

It is an object of the present invention to provide a worksurface-mounted power and communication receptacle assembly which can be moved between an open, operative position and a closed, storage position. Another object of the invention is to provide such an assembly which is relatively simple in its construction and assembly and which is easy to manufacture and install in a worksurface. A further object of the invention is to provide an efficient arrangement for the power and communication receptacles associated with the assembly. Yet another object of the invention is to provide such an assembly which is readily adaptable to accommodate different types of communication receptacles.

The invention contemplates a number of aspects, which can be employed alone, in various subcombinations as desired, or all together to enhance construction, assembly and operation of the assembly.

In accordance with one aspect of the invention, a utility assembly for use in combination with a worksurface having an opening includes a base securable to the worksurface within the opening and a utility receptacle member pivotably engaged with the base. The utility receptacle member includes a receptacle face with at least one utility receptacle associated therewith. The utility receptacle member is pivotably movable between an operative position in which the receptacle face is accessible from the first surface of the worksurface and a storage position in which the receptacle face is inaccessible from the first surface of the worksurface. Retainer structure is interposed between the base and the receptacle member for releasably maintaining the receptacle member in its operative position. The retainer structure is movable to an engagement position when the receptacle member is moved to its operative position for releasably maintaining the receptacle member in its operative position. The retainer structure is manually movable to a release position by the operator to enable the receptacle member to be moved to its storage position. The retainer structure includes one or more flexible resilient members on the utility receptacle member each having a tab or foot engageable with a retainer surface on the base. Engagement of the flexible resilient member with the base adjacent the retainer surface results in flexing of each flexible resilient member during movement of the utility receptacle member to its operative position and for moving the foot into engagement with the retainer surface. The utility receptacle member includes a pair of side walls which are pivotably engaged with the base, and a flexible resilient member is associated with each of the utility receptacle member side walls. The flexible resilient members are each in the form of a flexible portion of the side wall of the utility receptacle member, with the foot being located toward one end of the flexible portion.

In accordance with another aspect of the invention, the utility receptacle member of the utility assembly has an electrical receptacle associated with the utility receptacle face, and the utility receptacle member is movable between its operative and inoperative positions as described above. The receptacle member includes an open internal cavity within which electrical contact structure for the electrical receptacle is located, and the internal cavity opens in a first direction. A cable extends into the internal cavity of the utility receptacle member through a wall thereof, and the cable has a series of wires. Wire routing structure is provided in the internal cavity and includes a series of recesses opening in the first direction, with each recess being adapted to receive one of the series of wires. A cover is mounted to the utility receptacle member after placement of the cable and its wires, and the cover includes wire retainer structure for maintaining the wires within the recesses. The wire routing structure includes a series of internal walls located within the internal cavity, and electrical contact members are mounted to one or more of the internal walls. Each of the internal walls defines an upper end, and at least one of the recesses is formed toward the upper end of each wall. The cover includes a bottom surface, and the wire retainer structure consists of a series of retainer members extending from the bottom surface of the cover. The retainer members function to prevent movement of the wires out of the recesses formed in the upper ends of the internal walls. The internal walls are oriented at a non-perpendicular angle relative to the cover bottom surface, and the internal wall upper ends are located at different distances below the cover bottom surface. The retainer members extending from the cover bottom surface are sized and shaped so as to be in close proximity to the upper end of each internal wall so as to maintain the wires within the recesses.

In accordance with a further aspect of the invention, the base includes at least one stationary first utility receptacle. The utility receptacle member is movably mounted to the base as summarized above for movement between its operative and inoperative positions for accessing, or preventing access to, the receptacle face. The stationary first utility receptacle is accessible from adjacent the first surface of the worksurface when the utility receptacle member is in its operative position, and the utility receptacle member in its inoperative position prevents access to the first utility receptacle from adjacent the first surface of the worksurface. The base includes a recess within which the first utility receptacle is mounted. A cover is associated with the utility receptacle member, and the cover overlies the recess when the utility receptacle member is in its inoperative position for preventing access to the first utility receptacle. In its operative position, the cover provides access to the recess and the first utility receptacle. The utility receptacle member is movably engaged with the base adjacent the recess within which the first utility receptacle is mounted. The cover is mounted to and movable with the utility receptacle member, and extends over the recess.

In accordance with yet another aspect of the invention, the utility receptacle member includes an internal cavity defined by at least one outer wall. A utility cable extends into the internal cavity through the wall, and a strain relief arrangement is interposed between the cable and the wall for fixing the position of the cable relative to the wall, to prevent movement of the cable relative to the wall during movement of the utility receptacle member between its operative and inoperative positions. The outer wall of the internal cavity includes an opening through which the cable extends, and the strain relief arrangement includes a collar fixed to the cable and engageable with the outer wall adjacent the opening. The cover of the utility receptacle member encloses the internal cavity, and includes a tab or boss extending into the opening in the outer wall of the internal cavity and engageable with the collar.

The invention also contemplates a method of mounting a utility receptacle to a utility assembly for use in combination with a worksurface. The method involves mounting a base member within an opening formed in the worksurface, with the base member having a recess and including a first mounting section within the recess. The first mounting section has utility receptacle mounting structure for securing a first utility receptacle with a first mounting configuration to the base member. A cover is movably mounted to the base member for movement between an open position providing access to the recess and a closed position preventing access to the recess. The method further involves removing the first mounting section from the base member, and replacing the first mounting section with a second mounting section having utility receptacle mounting structure to secure a second utility receptacle having a second mounting configuration to the base member. The step of movably mounting a cover to the base member is carried out by securing the cover to a utility receptacle member which includes an additional utility receptacle, and pivotably mounting the utility receptacle member to the base such that pivoting movement of the utility receptacle member provides movement of the cover between its open and closed positions. The first mounting section is formed integrally with the base, and the step of removing the first mounting section from the base is carried out by separating the first mounting section from the base. The edges of the first mounting section are demarcated in order to assist in separating the first mounting section from the base. The first mounting section is removed from the base so as to leave a shoulder within the recess, and retainer structure is formed in the recess adjacent the shoulder by providing a locking tab within the recess and positioning the locking tab relative to the shoulder so as to receive an edge defined by the second mounting section therebetween. The second mounting section is engaged with the base by engaging the second mounting section with a first surface defined by the shoulder and deforming a portion of the second mounting section so as to engage a second surface defined by the shoulder, to grip the shoulder therebetween.

In accordance with yet another aspect of the invention, the utility receptacle member is pivotably and removably mounted to the base. The base includes a pair of spaced walls, and the utility receptacle member includes spaced side walls, each of which is located adjacent one of the spaced base walls. The utility receptacle member is pivotably and removably mounted to the base via disengageable pivoting connection structure associated with and interposed between the spaced walls of the base and the utility receptacle member side walls. The disengageable pivoting connection structure includes an opening formed in each side wall of the utility receptacle member, and a resilient flexible member associated with each of the spaced walls of the base. A protrusion is provided on each resilient flexible member, which is biased by its resiliency toward an engaged position in which its associated protrusion extends into one of the openings in a side wall of the utility receptacle member. The resilient flexible members are manually movable by an operator to a release position in which the protrusions are removed from the side wall openings. Each resilient flexible member is in the form of a section of the base wall which is deformable relative to the adjacent areas of the base wall. The deformable base wall section is formed between a pair of slots which extend inwardly from an edge of the base wall. The base walls each border a recess formed in the base and, as summarized above, a utility receptacle is located within each recess.

As noted previously, the various aspects of the invention as summarized above can be employed alone in order to enhance construction and/or operation of a utility receptacle assembly. Preferably, however, the various aspects are utilized either in combination or various subcombinations, as desired.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is a view somewhat similar to FIG. 5, showing the utility receptacle member in an open position;

FIG. 7 is a partial section view taken along line 7—7 of FIG. 5;

FIGS. 8a and 8b are partial section views showing the cover before and after mounting of the cover to the utility receptacle member, with reference to line 8—8 of FIG. 6;

FIG. 9 is a partial section view taken along line 9—9 of FIG. 6;

FIG. 10 is a partial section view taken along line 10—10 of FIG. 4;

FIG. 11 is a partial section view taken along line 11—11 of FIG. 6;

DETAILED DESCRIPTION OF THE INVENTION

Figure 1:
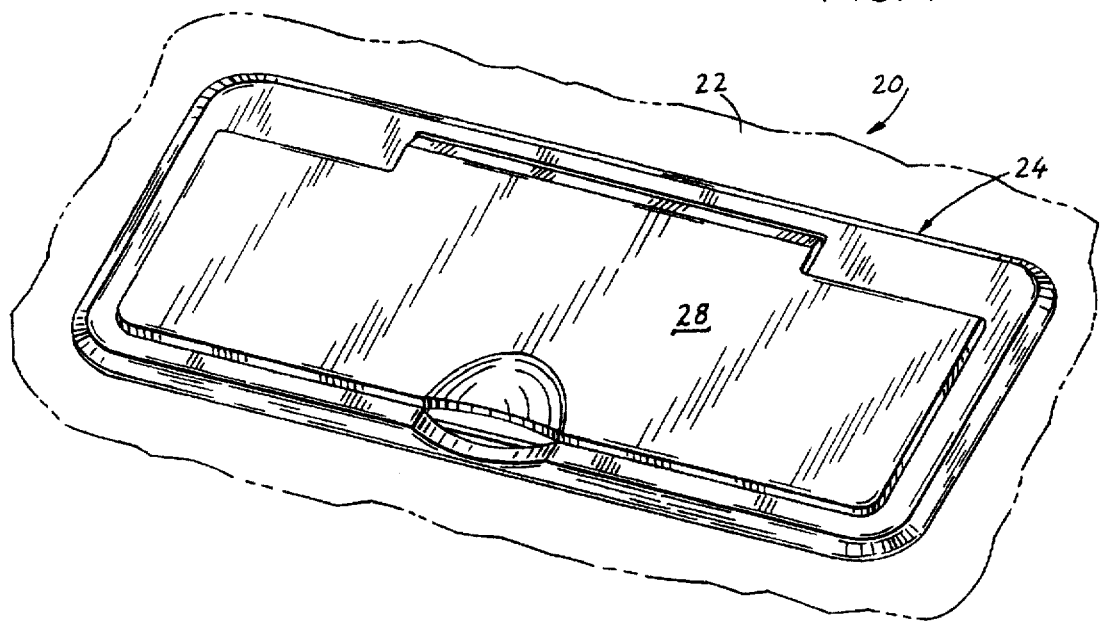
FIG. 1 is an isometric view showing a worksurface utility receptacle assembly constructed according to the invention in a closed or inoperative position.
Figure 2:
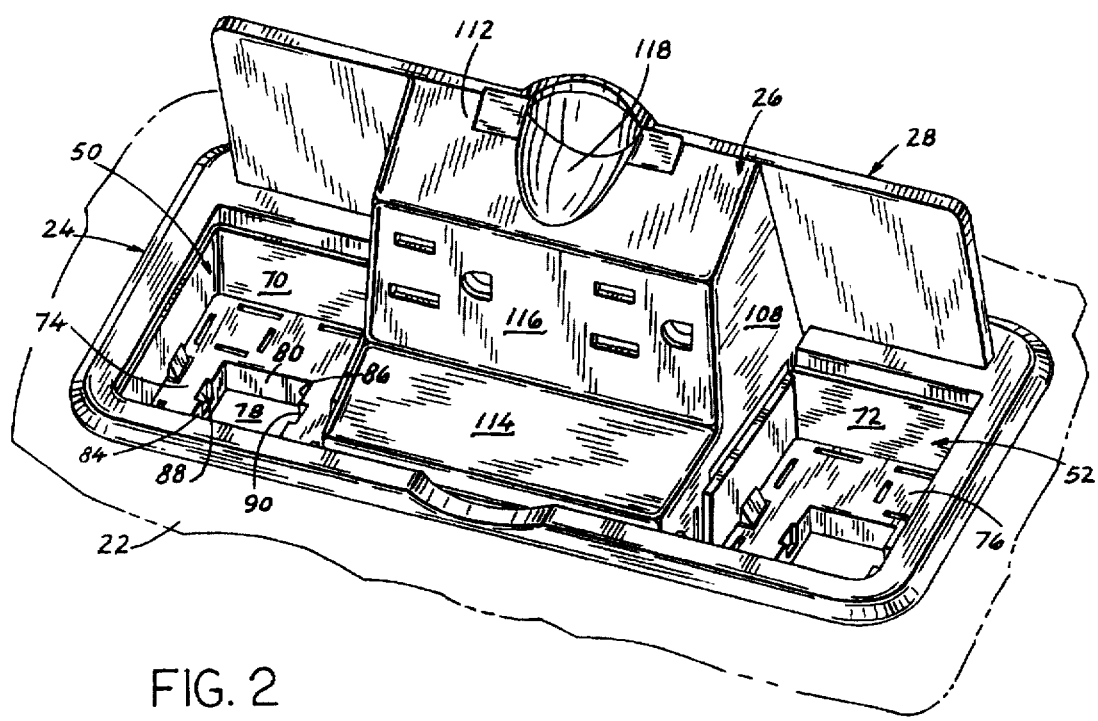
FIG. 2 is a view similar to FIG. 1, showing the worksurface utility receptacle assembly in an open or operative position.

Referring to FIGS. 1 and 2, a utility receptacle assembly 20 is adapted for mounting with an opening formed in a support surface 22, which may be a desk top, table top or any other worksurface or member where it is desired to provide selective access to power and/or communication receptacles. Generally, utility receptacle assembly 20 consists of a base member 24, a utility receptacle member 26, and a cover member 28 mounted to utility receptacle member 26 in a manner to be explained.

Utility receptacle assembly 20 is movable between a closed or inoperative position as shown in FIG. 1 and an open or operative position as shown in FIG. 2.

Figure 3:
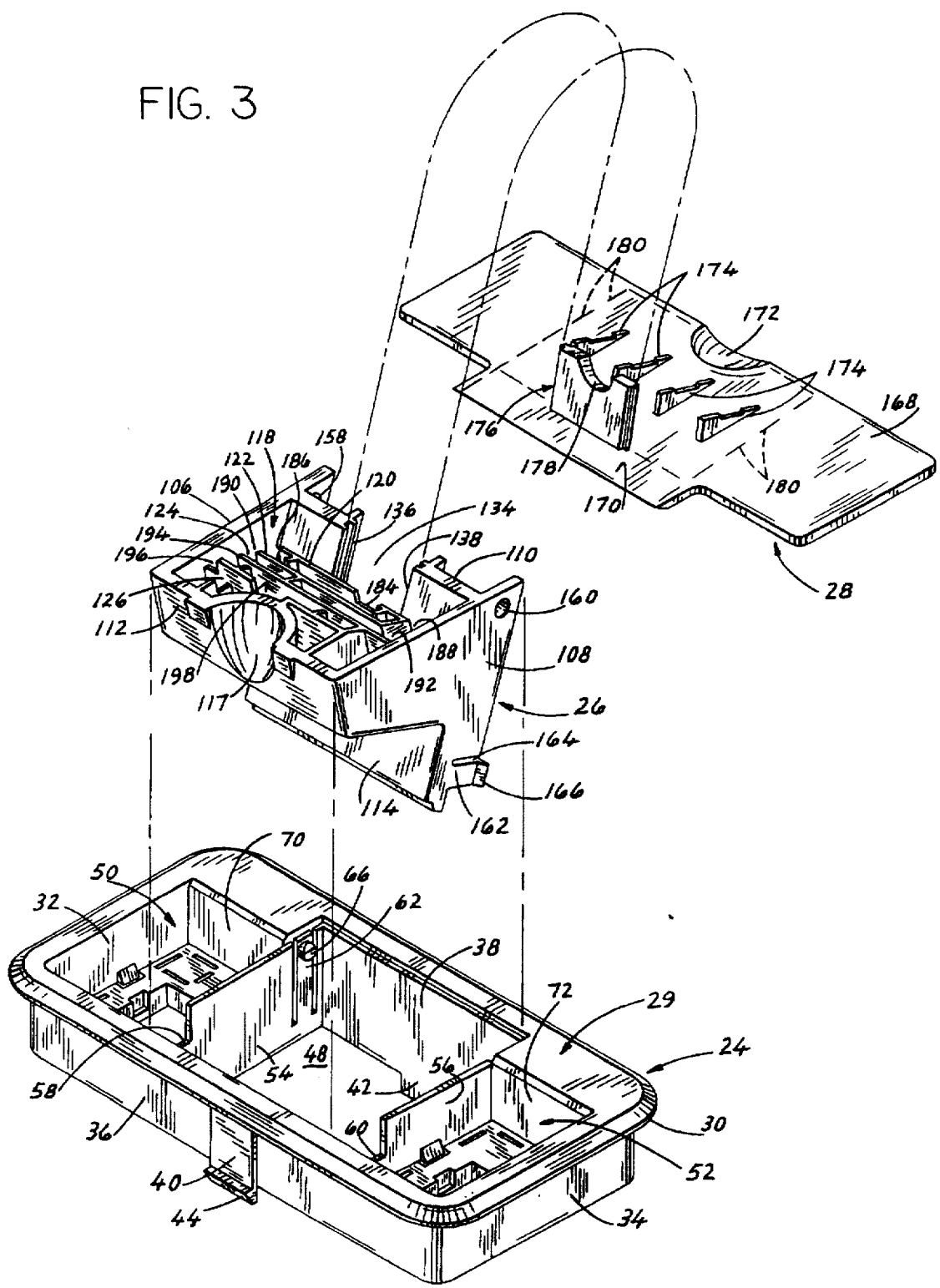
FIG. 3 is an exploded isometric view showing the components of the worksurface utility receptacle assembly of FIGS. 1 and 2.
Figure 5:
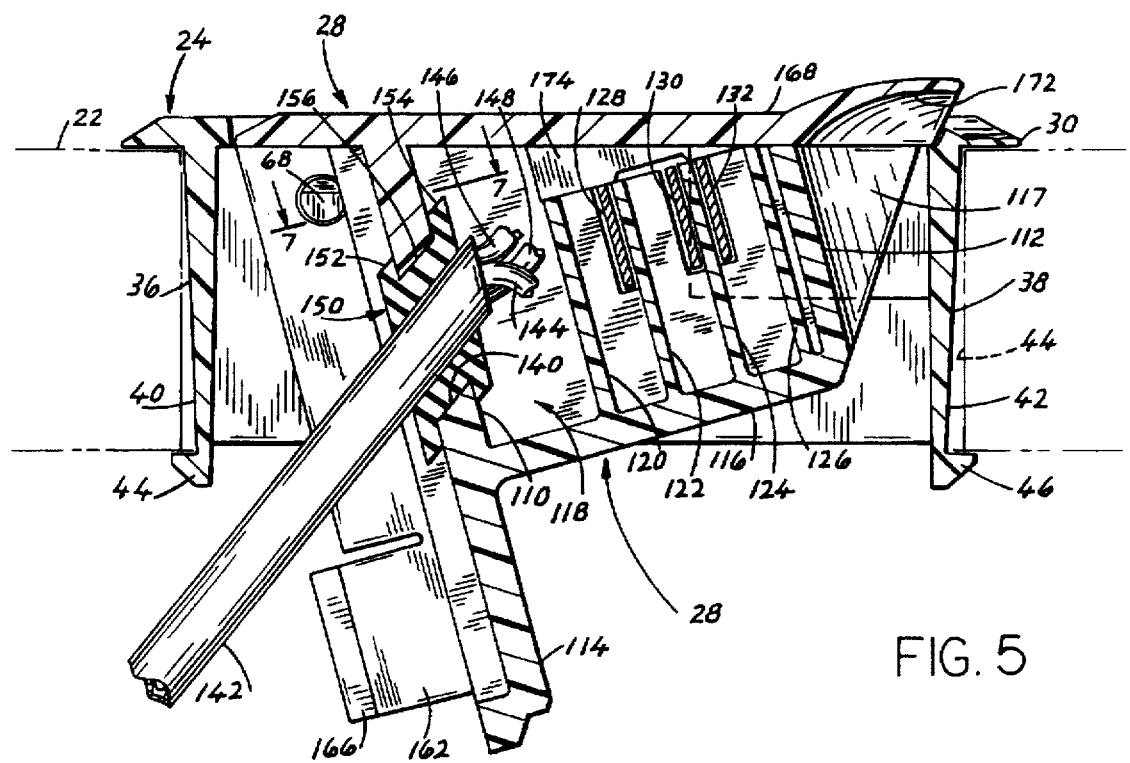
FIG. 5 is a section view taken along line 5—5 of FIG. 4.

As shown in FIGS. 2 and 3, base member 24 includes an upper wall 29 defining a peripheral lip 30. A pair of end walls 32, 34 and a pair of side walls 36, 38 extend downwardly from the underside of upper wall 29. Walls 32-38 are interconnected with each other at their ends to define a continuous peripheral wall structure. A pair of locking members 40, 42 are formed integrally with side walls 36, 38, respectively, and locking tabs 44, 46 formed at the lower ends of locking members 40, 42, respectively. Referring to FIG. 5, base member 24 is mounted to support surface 22 within an opening formed therein, shown at 44, such that lip 30 engages the upper surface of support surface 22 adjacent the upper edge of opening 44. Locking members 40, 42 deform inwardly toward each other as walls 32-38 are forced through opening 44, after which locking members 40, 42 return to their FIG. 5 position to engage locking tabs 44, 46 with the lower surface of support surface 22. This functions to retain base member 24 in position relative to support surface 22. Alternatively, it is understood that any other satisfactory or conventionally known type of grommet mounting structure may be employed to secure base member 24 to support surface 22.

As shown in FIG. 3, base member 24 further includes a central passage 48 and a pair of side recesses 50, 52 located one on either side of central passage 48. Passage 48 extends completely through base member 24, whereas recesses 50, 52 face upwardly.

Passage 48 is defined by central portions of side walls 36, 38, in combination with a pair of transverse walls 54, 56 extending between the facing surfaces of side walls 36, 38. Transverse walls 54, 56 include notches at their forward ends, defining horizontal retainer surfaces 58, 60,. respectively.

A pair of flexible, resilient fingers 62, 64 are formed in transverse walls 54, 56, respectively, by a pair of spaced slots which extend downwardly from the upper ends of walls 54, 56, respectively and which terminate short of the lower wall ends. Fingers 62, 64 are normally flush with walls 54, 56, respectively, and are biased to this position by the connection of fingers 62, 64 to the walls at their lower ends. Facing, inwardly extending protrusions 66, 68 are formed on fingers 62, 64, respectively, toward their upper ends.

Recess 50 is defined by facing portions of end wall 32 and transverse wall 54, in combination with an end portion of side wall 36 and a rear wall 70 parallel to and spaced from side wall 36. Similarly, recess 52 is defined by facing portions of end wall 34 and transverse wall 56, in combination with an end portion of side wall 36 and of rear wall 72 which extends parallel to side wall 36. Fingers 62, 64 are located rearwardly of rear walls 70, 72, respectively, and are capable of flexing outwardly into spaces disposed between rear walls 70, 72, respectively, and side wall 38.

Figure 4:
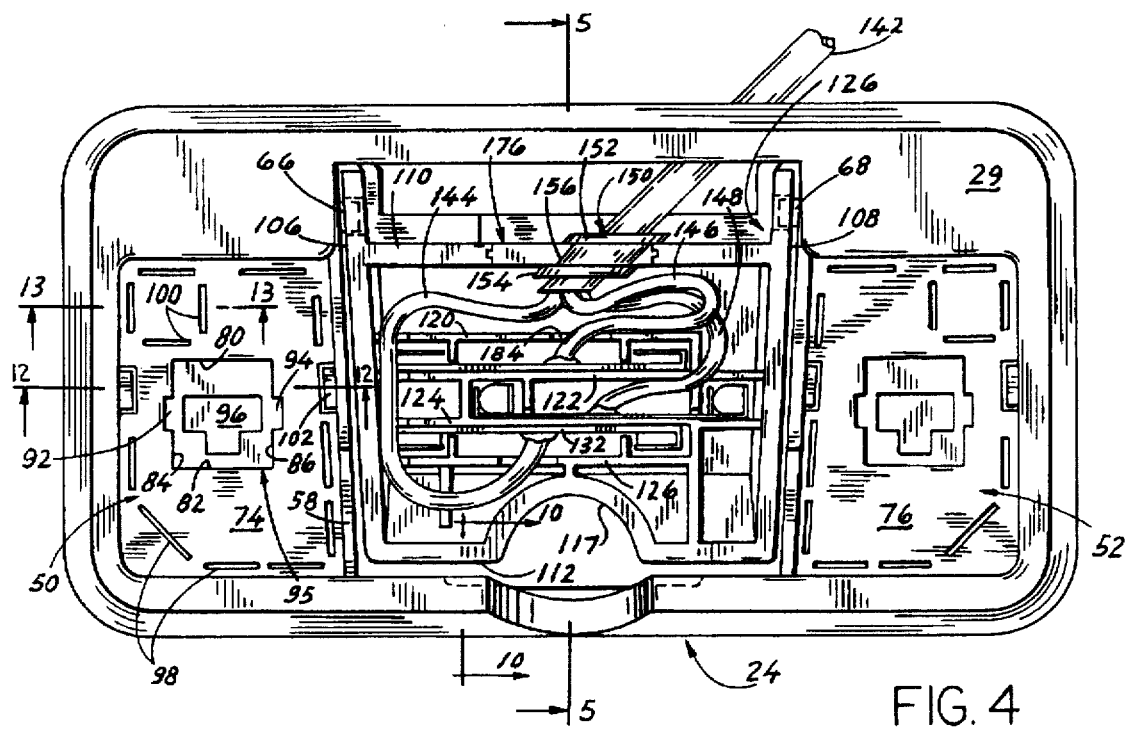
FIG. 4 is a top plan view of the assembled components of FIGS. 1-3, with the cover removed.

Referring to FIGS. 3 and 4, mirror-image bottom sections 74, 76 define the lower extent of recesses 50, 52, respectively. Bottom section 74 will be described in detail, with the understanding that such description applies with equal force to bottom section 76.

As shown in FIGS. 2, 3 and 4, bottom section 74 includes a rectangular passage 78 defined by side walls 80, 82 and end walls 84, 86. End walls 84, 86 include central recesses 88, 90, respectively, which receive locking ears 92, 94, respectively, of a communication receptacle 95 which is received within passage 78 and extends downwardly therefrom. Receptacle 95 includes a conventional mounting recess 96 having contact structure for receiving a communication jack, in a manner as is known. Receptacle 95 may be that such as is manufactured and sold by AT&T under its Part No. 30093.

A series of spaced slots 98 are formed about the periphery of bottom section 74 slightly inwardly from the surfaces of walls 32, 36, 54 and 70 which define recess 50. A pair of perpendicular slots 100 are formed in bottom section 74 adjacent the corner of walls 32 and 70.

Figure 12:
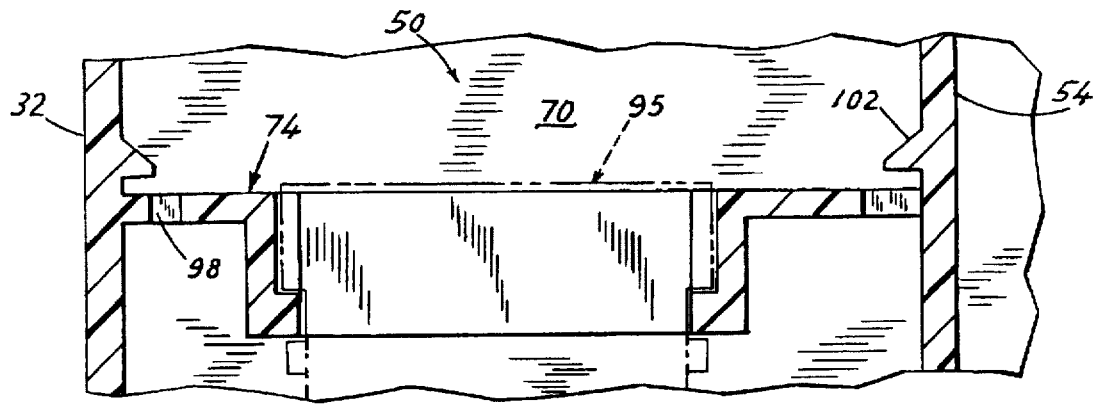
FIG. 12 is a partial section view taken along line 12—12 of FIG. 4.

Referring to FIG. 12, a pair of locking tabs 102 are formed integrally with walls 32, 54. The purpose and function of slots 98, 100 and locking tabs 102 will later be explained.

As shown in FIGS. 2 and 3, utility receptacle member 26 includes a pair of side walls 106, 108, a rear wall 110 and a stepped front wall construction including an upper wall section 112, a lower wall section 114 and a receptacle face 116 extending therebetween. A finger notch 117 is formed in upper wall section 112, and conventional electrical receptacle slots and openings are formed in receptacle face 116 for receiving the prongs of a three-prong, grounded electrical plug-type connector (not shown), in accordance with conventional technology.

Referring to FIGS. 3 and 4, side walls 106, 108 in combination with upper wall section 112 and rear wall 110 cooperate to define an upwardly facing cavity 118. Receptacle face 116 is substantially perpendicular to lower wall section 114, and a series of internal walls 120, 122, 124 and 126 extend perpendicularly to receptacle face 116 into cavity 118. Walls 120-126 are parallel and equal in height. An electrical contact plate 128 is mounted to wall 122, and similarly a pair of electrical contact plates 130, 132 are mounted to opposite sides of wall 124.

As shown in FIGS. 3 and 5, an upwardly-facing opening 134 is formed in rear wall 110. Opening 134 is defined by spaced, parallel grooved side edges 136, 138 and a bottom edge 140 (FIG. 5) extending between side edges 136, 138. Edges 136-138 provide opening 134 with an upwardly-opening U-shaped configuration which communicates with internal cavity 118.

As shown in FIGS. 4 and 5, an electrical cable 142 extends through opening 134 and into internal cavity 118. Electrical cable 142 is conventional in construction, including a series of wires 144, 146 and 148.

A keyed grommet or collar 150 is molded integrally with cable 142. Collar 150 is circular, and defines an outer flange 152, an inner flange 154 and a groove 156 between flanges 152 and 154. Collar 150 is engaged with rear wall 110 such that groove 156 receives bottom edge 140 and a lower portions of side edges 136 and 138 of opening 134.

Referring to FIG. 3, side walls 106, 108 include openings 158, 160, respectively located toward the upper and rearward corner of each side wall. A retainer member, such as 162, is formed integrally with each of side walls 106, 108. Each retainer member, such as 162, is resilient and flexible, and is defined by a slot such as 164 extending inwardly from the rearward edge of the side wall. A foot such as 166 is formed at the end of retainer member 162.

As shown in FIG. 3, cover member 28 is engageable with the upper end of utility receptacle member 26, and is adapted to be mounted and secured to utility receptacle member 26. Cover member 28 includes a planar wall 168 having an extension 170 and a finger notch 172. A series of substantially triangular retainer bosses 174 extend from the lower surface of wall 168, and are oriented so as to angle downwardly in a rearward direction. A cable-locking strain relief tab 176 extends downwardly from wall 168, and includes flanged side edges and a bottom edge having a semicircular recess 178.

Preferably, base member 24, utility receptacle member 26 and cover member 28 are one-piece members formed by any satisfactory process such as injection molding from any suitable thermoplastic material. It is contemplated that a material such as polycarbonate would provide satisfactory strength and molding characteristics for components 24–28.

Cover member 28 is mounted to utility receptacle member 26 such that the lower surface of wall 168 abuts the upper ends of utility receptacle member side walls 106, 108, rear wall 110 and upper wall section 112. Tab 176 is inserted into opening 134 such that the flanged edges of tab 176 are received within grooved side edges 136, 138 of opening 134, as shown in FIG. 7. In this position, the edge of tab recess 178 is received within strain relief collar groove 156. This functions to lock collar 150 in place relative to cover member 28 and utility receptacle member 26, thus preventing relative movement between electrical cable 142 and the assembly defined by cover member 28 and utility receptacle member 26.

Referring to FIG. 8a, an intermittent longitudinal triangular ridge 180 extends downwardly from the lower surface of wall 168 over each of side walls 106, 108, rear wall 110 and upper wall section 112. Cover member 28 is secured to utility receptacle member 26 in any satisfactory manner, but is preferably sonic-welded to provide a strong, permanent bond between cover member 28 and utility receptacle member 26. FIG. 8a shows ridge 180 in position prior to sonic-welding of cover member 28 to utility receptacle member 26. After cover member 28 and utility receptacle member 26 are sonic-welded together, the material of ridge 180 assists in securing the components together.

As shown in FIGS. 3 and 4, internal walls 120, 122, 124 and 126 include a series of upwardly facing recesses. Wall 120 includes a recess 184 and end recesses 186, 188; wall 122 includes end recesses 190 and 192; wall 124 includes an end recess 194; and wall 126 includes an end recess 196 and an intermediate recess 198.

As shown in FIG. 4, wire 144 extends through recesses 186, 190, 194 and 196 along the inner surface of side wall 106, passing back through recess 198 for connection to contact plate 132. Wire 146 extends through recess 184 in wall 120 for connection to contact plate 128, and wire 148 extends through recesses 188 and 192 and through the space between walls 122 and 124 for connection to contact plate 130. The ends of wires 144–148 are crimped to their respective contact plates for secure connection thereto. After cover member 28 has been secured to utility receptacle member 26, retainer bosses 174 function to maintain wires 144–148 within their respective recesses and to prevent the wires from being moved out of the recesses. This prevents accidental contact of the wire ends with each other and ensures the integrity of the wire connections to contact plates 128–132. This, in combination with engagement of collar 150 with rear wall 110 and tab 176, functions to prevent any movement of wires 144–148 within internal cavity 118 after cover member 28 has been secured to utility retainer member 26.

When utility receptacle assembly 20 is assembled as shown in FIGS. 1, 2 and 4–6, protrusions 66 and 68 of fingers 62 and 64 are received within openings 158 and 160, respectively, of utility receptacle member 108. This occurs by inserting utility receptacle member 26 into passage 48, with utility receptacle member side walls 106, 108 having a close tolerance relative to passage transverse walls 54, 56, respectively. The operator presses outwardly on fingers 62 and 64 to move protrusions 66 and 68, respectively, outwardly away from passage 48 to move the inner ends of protrusions 66, 68 to a flush or recessed position relative to transverse walls 54, 56, respectively. FIG. 9 illustrates such movement of finger 62 to its disengagement position, shown in phantom. This enables the user to slide utility receptacle member 108 rearwardly such that openings 158, 160 are in alignment with protrusions 66, 68. The resiliency of fingers 62, 64 returns fingers 62, 64 to an engagement position shown in solid lines in FIG. 9, in which the fingers are coplanar with their respective transverse side wall, such as 54, 56, respectively. Protrusions 66, 68 thus extend into openings 158, 160, respectively. This functions to pivotably and removably mount utility receptacle member 108 and cover member 28 to base 24. To remove utility receptacle member 108, the user manually depresses fingers 62, 64 to disengage protrusions 66, 68, respectively, from openings 158, 160, respectively, while simultaneously applying an outward force to utility receptacle member 108 to withdraw utility receptacle member 108 upwardly out of passage 48 for removal from base 24.

In operation, utility receptacle assembly 20 functions as follows. Once cover member 28 is secured to utility receptacle member 26, utility receptacle member 26 is pivotably mounted to base 24, and base 24 is secured to support surface 22, the user then has access to the electrical power receptacles on receptacle face 116 and/or communication recesses 96. To gain access, the operator inserts his finger into finger notch 117 formed in upper wall section 112, below finger notch 172 in cover member wall 168. The user then lifts upwardly on finger notch 172, which results in pivoting movement of utility receptacle member 108 and cover member 28 moving to the open or accessible position as shown in FIGS. 2 and 6. Upon such pivoting movement of utility receptacle member 26 to its open or accessible position, the feet 166 of the tabs, such as 162, associated with side walls 106 and 108 engage the portions of transverse side walls 54 and 56 below retainer surfaces 58 and 60. This is shown in FIG. 11, in which the feet, such as 166, are shown in phantom prior to engagement with the retainer surfaces, such as 60. Once the ends of the feet, such as 166, have cleared retainer surfaces 58, 60, the resiliency of the retainer members, such as 162, moves the associated feet, such as 166, outwardly such that the outer portions of the feet overlie and engage retainer surfaces 58, 60, as shown in solid lines in FIG. 9. This maintains utility receptacle member 26 in its operative or open position. Referring to FIG. 2, further rearward pivoting movement of utility receptacle member 26 is prevented by engagement of the lower, outer edges of cover member 28 with the upper surface of base member upper wall 28, which essentially locks utility receptacle member 26 in its open or operative position. Movement of utility receptacle member 26 and cover 28 to the open position provides access to recess 50 and 52 and the communication receptacles mounted therein. The user then inserts one or more power plugs into the power receptacles of receptacle face 116 and one or more communication cables with the communication receptacles, such as 95, secured to recess bottom sections 74, 76. To return utility receptacle member 108 to its closed position of FIG. 1, the user manually engages the tabs, such as 102, on the opposite sides of utility receptacle member 26 and presses the tabs inwardly toward each other to move the feet, such as 166, associated with each tab out of alignment with retainer surfaces 58, 60. This enables utility receptacle member 108 to be pivoted back to its closed or inoperative position of FIG. 1. In this position, the portions of cover 28 extending from the sides of utility receptacle member 26 overlie recesses 50 and 52, preventing access to the recesses and the communication receptacles mounted therein.

As shown in FIG. 10, the front edge of cover member 28 includes a lip 200, and the front edge of the opening in base member upper wall 28 includes an undercut 202. Lip 200 and undercut 202 cooperate to provide a snap-type detent for releasably maintaining cover member 28 in its FIG. 1 position.

Figure 13:
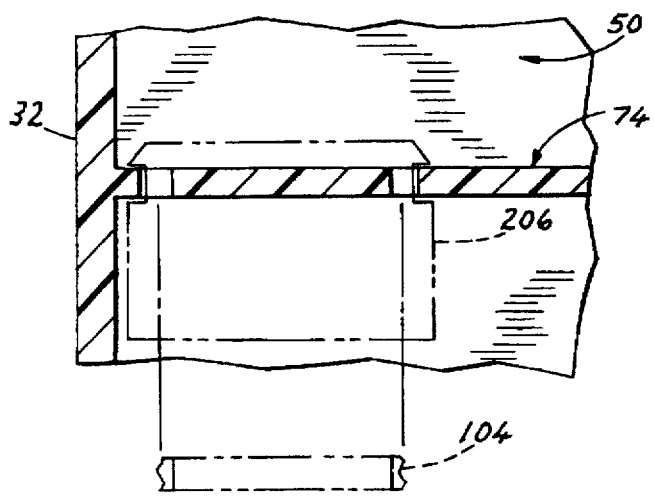
FIG. 13 is a partial section view taken along line 13—13 of FIG. 4.

FIGS. 12 and 13 illustrate the utility receptacle mounting arrangement for recess 50, with the understanding that this description applies equally to the receptacle mounted within recess 52. As shown in FIG. 12, communication receptacle 95 having a first mounting configuration is secured within the passage, such as 78, formed in bottom section 74. If desired, the user can form an opening in base section 74 by cutting along slots 100 and the two slots 98 adjacent thereto, to form a square cut-out in the corner of bottom section 78. The user can then feed a male telephone jack through the square opening, which can be pulled out by the user for connection to a communication device.

Figure 14:
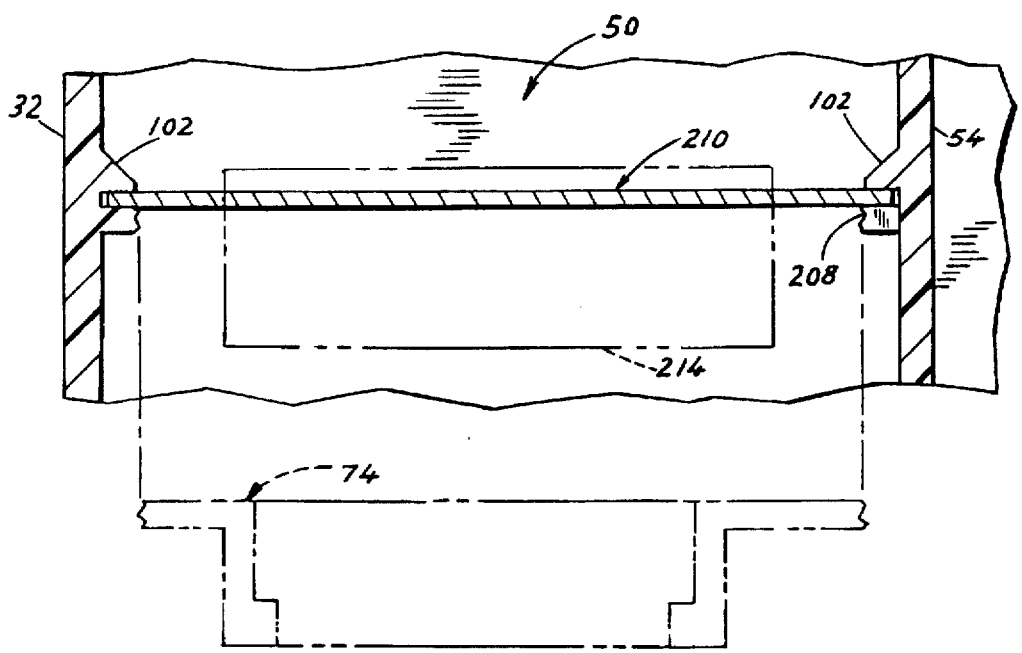
FIG. 14 is a view similar to FIG. 12, showing engagement of a second mounting section for receiving a utility receptacle having a mounting structure different than the receptacle shown in FIG. 12.

If the user wishes to employ a communication receptacle having a mounting configuration different than that of receptacle 95, the user (or the manufacturer) removes the base section, such as 78, by cutting along peripheral slots 98, which separates the majority of the inner area of bottom section 74 from base member 24, as shown in FIG. 14. This leaves a peripheral ledge or lip, shown in FIG. 14 at 208. The user can then install a different bottom section, shown in FIG. 14 at 210. Bottom section 210 has an edge which fits between the upper surface of lip 208 and the downwardly facing surface of one of tabs 102. The opposite edge of bottom section 210 is then forced downwardly and over the other tab 102 so as to assume the position as shown in FIG. 14, to securely mount bottom section 210 to base member 24. Bottom section 210 can have any mounting configuration as desired, according to user or manufacturer requirements, to secure a second receptacle 214 within recess 50.

It is to be appreciated that electrical cable 142 and a communication cable interconnected with the communication receptacles, such as 95, are routed below support surface 22 in accordance with conventional furniture electrification and communication technology.

Various alternatives and embodiments are contemplated as being within the scope of the following claims particularly pointing out and distinctly claiming the subject matter regarded as the invention.

We claim:

1. A utility assembly for use in combination with a worksurface, the worksurface having an opening which opens onto a first one of its surfaces, comprising:

a base stationarily mounted to the worksurface within the opening, wherein the base includes a recess having a first mounting section with mounting structure for stationarily mounting a first utility receptacle having a first configuration;

a utility receptacle member pivotably and removably mounted to the base, the utility receptacle member including a utility receptacle face and having an electrical receptacle associated with the face, the utility receptacle member being pivotable between an operative position in which the receptacle face is accessible from adjacent the first surface of the worksurface and a storage position in which the receptacle face is inaccessible from adjacent the worksurface, wherein the receptacle member includes an open internal cavity within which electrical contact structure for the electrical receptacle is located, wherein the internal cavity opens in a first direction;

a cable extending into the internal cavity of the receptacle member through a wall thereof, the cable having a plurality of wires;

wire routing structure associated with the internal cavity and including a plurality of recesses opening in the first direction, wherein each recess is adapted to receive one of the plurality of wires;

a cover mounted to the receptacle member and including retainer structure for maintaining the wires within the recesses;

releasable retainer structure interposed between the base and the receptacle member for releasably maintaining the receptacle member in its operative position, the releasable retainer structure being movable to an engagement position when the receptacle member is moved to its operative position for releasably maintaining the receptacle member in its operative position, and being manually movable to a release position by an operator to enable the receptacle member to be moved to its storage position;

wherein the first utility receptacle is accessible through the recess in the base when the utility receptacle member is in its operative position, and wherein the utility receptacle member in its storage position prevents access to the first utility receptacle;

wherein the first mounting section of the base is removable from the base and replaceable with a second mounting section having utility receptacle mounting structure to secure a second utility receptacle having a second configuration to the base member.

2. A utility assembly for use in combination with a worksurface, the worksurface having an opening which opens onto a first one of its surfaces, comprising:

a base securable to the worksurface within the opening;

a utility receptacle member pivotably engaged with the base, and including a receptacle face with at least one utility receptacle associated therewith, wherein the receptacle member is pivotably movable between an operative position in which the receptacle face is accessible from adjacent the first surface of the worksurface and a storage position in which the receptacle face is inaccessible from adjacent the first surface of the worksurface; and retainer structure interposed between the base and the receptacle member for releasably maintaining the receptacle member in its operative position, the retainer structure being movable to an engagement position when the receptacle member is moved to its operative position for releasably maintaining the receptacle member in its operative position, and being manually movable to a release position by an operator to enable the receptacle member to be moved to its storage position.

3. The utility assembly of claim 2, wherein the utility receptacle member is pivotably engaged with the base via pivoting mounting structure providing releasable engagement of the utility receptacle member with the base.

4. The utility assembly of claim 2, wherein the retainer structure comprises a flexible, resilient member having a foot engageable with a retainer surface on the base, wherein engagement of the resilient member foot with the base adjacent the retainer surface results in flexing of the resilient member during movement of the receptacle member to its operative position for moving the foot into engagement with the retainer surface.

5. The utility assembly of claim 4, wherein the utility receptacle member includes a pair of side walls which are pivotably engaged with the base, and wherein a flexible resilient member is associated with each side wall.

6. The utility assembly of claim 4, wherein each flexible resilient member comprises a flexible portion of a wall of the utility receptacle member, wherein the foot is located toward an end of the flexible portion.

7. A utility assembly for use in combination with a worksurface having an opening, comprising:

a utility receptacle member movably mounted within the opening and including a utility receptacle face, the utility receptacle member having an electrical receptacle associated with the utility receptacle face and being movable between a first operative position providing access to the utility receptacle face from the worksurface and a second storage position in which the utility receptacle face is inaccessible from the worksurface, wherein the receptacle member includes an open internal cavity within which electrical contact structure for the electrical receptacle is located, wherein the internal cavity opens in a first direction;

a cable extending into the internal cavity of the receptacle member through a wall thereof, the cable having a plurality of wires;

wire routing structure associated with the internal cavity and including a plurality of recesses opening in the first direction, wherein each recess is adapted to receive one of the plurality of wires; and a cover mounted to the receptacle member and including retainer structure for maintaining the wires within the recesses.

8. The utility assembly of claim 7, further comprising a strain relief arrangement interposed between the cable and a wall of the utility receptacle member to prevent movement of the cable relative to the wall during movement of the utility receptacle member between its operative and inoperative positions.

9. The utility assembly of claim 8, wherein the utility receptacle member wall includes an opening through which the cable extends, and wherein the strain relief arrangement comprises a collar secured to the cable, the collar being engageable with the utility receptacle member wall adjacent the opening, and a tab extending from the cover and into the opening and engageable with the collar.

10. A utility assembly for use in combination with a worksurface, the worksurface having an opening which opens onto a first one of its surfaces, comprising:

a base stationarily mounted to the worksurface within the opening, wherein the base includes at least one stationary first utility receptacle;

a utility receptacle member movably engaged with the base, and including a receptacle face with at least one second utility receptacle associated therewith, wherein the utility receptacle member is movable between an operative position in which the receptacle face is accessible from adjacent the first surface of the worksurface and a storage position in which the receptacle face is inaccessible from adjacent the first surface of the worksurface, and wherein the stationary first utility receptacle is accessible from adjacent the first surface of the worksurface when the utility receptacle member is in its operative position, and wherein the utility receptacle member in its storage position prevents access to the first utility receptacle from adjacent the first surface of the worksurface.

11. The utility assembly of claim 10, wherein the base includes a recess within which the first utility receptacle is stationarily mounted.

12. The utility assembly of claim 11, further comprising a cover associated with the utility receptacle member, wherein the cover overlies the recess when the utility receptacle member is in its inoperative position for preventing access to the first utility receptacle, and wherein the cover provides access to the recess and the first utility receptacle when the utility receptacle member is in its operative position.

13. The utility assembly of claim 11, wherein the utility receptacle member is movably engaged with the base adjacent the recess within which the utility receptacle member is mounted, and further comprising a cover mounted to and movable with the utility receptacle member which extends over the recess, wherein the cover overlies the recess when the utility receptacle member is in its inoperative position for preventing access to the first utility receptacle, and wherein the cover provides access to the recess and the first utility receptacle when the utility receptacle member is in its operative position.

14. The utility assembly of claim 13, wherein the receptacle member includes an open internal cavity within which contact structure for a receptacle associated with the receptacle face is located, wherein the internal cavity opens in a first direction, and further comprising a cable extending into the internal cavity of the receptacle member through a wall thereof, the cable having a plurality of wires; wire routing structure associated with the internal cavity and including a plurality of recesses opening in the first direction, wherein each recess is adapted to receive one of the plurality of wires; and wire retainer structure provided on the cover for maintaining the wires within the recesses.

15. The utility assembly of claim 13, wherein a wall of the utility receptacle member includes an opening through which the cable extends, and further comprising a strain relief arrangement interposed between the cable and the utility receptacle member wall, the strain relief arrangement including a collar secured to the cable, the collar being engageable with the utility receptacle member wall adjacent the opening; and a boss extending from the cover and into the opening and engageable with the collar.

16. The utility assembly of claim 10, wherein the base includes a first mounting section to which the first utility receptacle is mountable, and wherein the first mounting section is removable and replaceable with a second mounting section engageable with the base for mounting a utility receptacle to the base having a different mounting configuration than that of the first utility receptacle.

17. A utility assembly for use in combination with a worksurface having an opening, comprising:

a utility receptacle member movably mounted within the opening and including a utility receptacle face, the utility receptacle member having an electrical receptacle associated with the utility receptacle face and being movable between a first operative position providing access to the utility receptacle face from the worksurface and a second storage position in which the utility receptacle is inaccessible from the worksurface, wherein the receptacle member includes an open internal cavity within which electrical contact structure for the electrical receptacle is located, wherein the internal cavity opens in a first direction;

a cable extending into the internal cavity of the receptacle member through a wall thereof, the cable having a plurality of wires;

wire routing structure associated with the internal cavity and including a plurality of recesses opening in the first direction, wherein each recess is adapted to receive one of the plurality of wires, and a series of internal walls disposed within the internal cavity, each wall defining an upper end, and wherein at least one of the plurality of recesses is formed toward the upper end of each wall, and a cover mounted to the receptacle member and including retainer structure for maintaining the wires within the recesses.

18. The utility assembly of claim 17, wherein the electrical contact structure comprises one or more electrically conductive members mounted to one or more of the internal walls.

19. The utility assembly of claim 17, wherein the cover includes a bottom surface, and wherein the cover retainer structure comprises a plurality of retainer members extending from the cover bottom structure, wherein the retainer members function to prevent movement of the wires out of the recesses formed in the upper ends of the internal walls.

20. The utility assembly of claim 19, wherein the internal walls are oriented at a non-perpendicular angle relative to the cover bottom surface, and wherein the internal wall upper ends are differently spaced below the cover bottom surface, and wherein the retainer members are sized and shaped so as to be in close proximity to the upper end of each internal wall.

21. A utility assembly for use in combination with a worksurface having an opening, comprising:

a utility receptacle member movably mounted within the opening and including a utility receptacle face, the utility receptacle member being movable between a first operative position providing access to the utility receptacle face from adjacent the worksurface and a second storage position in which the utility receptacle face is inaccessible from the worksurface, wherein the utility receptacle member includes an internal cavity defined by at least one wall;

a utility cable extending into the internal cavity through an opening in the internal cavity wall; and a strain relief arrangement interposed between the cable and the wall for fixing the position of the cable relative to the wall to prevent movement of the cable relative to the wall during movement of the utility receptacle member between its operative and inoperative positions, the strain relief arrangement comprises a collar fixed to the cable and engageable with the internal cavity wall adjacent the opening for fixing the position of the cable relative to the wall; and a cover enclosing the internal cavity of the utility receptacle member, and wherein the cover includes a tab extending into the opening in the internal cavity wall and engageable with the collar.

22. The utility assembly of claim 21, wherein the cable includes a plurality of wires, and further comprising wire routing structure located within the internal cavity and including a plurality of recesses facing the cover, wherein each recess is adapted to receive one of the plurality of wires, and wire retaining structure provided on the cover for maintaining the wires within the recesses.

23. A utility assembly for use in combination with a worksurface, the worksurface having an opening which opens onto a first one of its surfaces, comprising:

a base securable to the worksurface within the opening and including a pair of spaced walls;

a utility receptacle member pivotably and removably mounted to the base, the utility receptacle member including a receptacle face with at least one utility receptacle associated therewith, wherein the receptacle member is pivotably movable between an operative position in which the receptacle face is accessible from adjacent the first surface of the worksurface and a storage position in which the receptacle face is inaccessible from adjacent the first surface of the worksurface and further including a pair of spaced side walls, and wherein the utility receptacle member is pivotably and removably mounted to the base via disengageable pivoting connection structure associated with and interposed between the spaced walls of the base and the utility receptacle member side walls, and wherein the disengageable pivoting connection structure comprises an opening formed in each side wall of the utility receptacle member, a resilient flexible member associated with each of the spaced walls of the base, and a protrusion provided on each resilient member, wherein each resilient flexible member is biased by its resiliency toward an engaged position in which its protrusion extends into an opening in one of the side walls of the utility receptacle member, and is manually movable by an operator to a release position in which the protrusion is removed from the side wall opening.

24. The utility assembly of claim 23, wherein each resilient flexible member comprises a section of the base wall which is deformable relative to the adjacent areas of the base wall.

25. The utility assembly of claim 24, wherein each of the pair of spaced base walls defines an edge, and wherein the deformable section of the base wall is formed between a pair of spaced slots extending inwardly from the edge of the base wall.

26. A utility assembly for use in combination with a worksurface, the worksurface having an opening which opens onto a first one of its surfaces, comprising:

a base securable to the worksurface within the opening and including a pair of spaced walls;

a utility receptacle member pivotably and removably mounted to the base, the utility receptacle member including a receptacle face with at least one utility receptacle associated therewith, wherein the utility receptacle member is pivotably movable between an operative position in which the receptacle face is accessible from adjacent the first surface of the worksurface and a storage position in which the receptacle face is inaccessible from adjacent the first surface of the worksurface and further including a pair of spaced side walls and wherein the utility receptacle member is pivotably and removably mounted to the base via disengageable pivoting connection structure associated with and interposed between the spaced walls of the base and the utility receptacle member side walls; and retainer structure interposed between the base and the utility receptacle member for releasable maintaining the utility receptacle member in its operative position, the retainer structure being movable to an engagement position when the receptacle member is moved to its operative position for releasably maintaining the utility receptacle member in its operative position, and being manually movable to a release position by an operator to enable the utility receptacle member to be moved to its storage position.

27. The utility assembly of claim 26, wherein each of the pair of base side walls borders a recess formed in the base, and further comprising a utility receptacle located within each recess.

28. The utility assembly of claim 27, wherein the utility receptacle member includes a cover which overlies the recesses when the utility receptacle member is in its inoperative position for preventing access to the utility receptacles located within the recesses, and wherein movement of the utility receptacle member to its operative position provides access to the recesses and the utility receptacles therewithin.

* * * * *

UNITED STATES PATENT AND TRADEMARK OFFICE
CERTIFICATE OF CORRECTION

PATENT NO. : 5,709,156

DATED : January 20, 1998

INVENTOR(S) : STEVEN C. GEVAERT ET AL

It is certified that error appears in the above-indentified patent and that said Letters Patent is hereby corrected as shown below:

<u>The Title</u> Page Item [54],

Delete "COMMUNICATIONS" and substitute therefor -- COMMUNICATION --

Claim 19, column 13, line 29, delete "structure" and substitute therefor -- surface --; Claim 21, column 13, line 58, after "," insert -- wherein --; Claim 26, column 14, line 65, delete "releasable" and substitute therefor -- releasably --.

Signed and Sealed this

Twenty-third Day of June, 1998

Attest:

BRUCE LEHMAN

Attesting Officer

Commissioner of Patents and Trademarks